United States Patent [19]

Gooch

[11] Patent Number: 4,758,917
[45] Date of Patent: Jul. 19, 1988

[54] MAGNETIC TRANSDUCER ASSEMBLY WITH IMPROVED CROSSTALK REDUCTION

[75] Inventor: Beverley R. Gooch, Sunnyvale, Calif.

[73] Assignee: Ampex Corporation, Redwood City, Calif.

[21] Appl. No.: 851,592

[22] Filed: Apr. 11, 1986

[51] Int. Cl.[4] .............................................. G11B 5/265
[52] U.S. Cl. ................................... 360/121; 360/124; 360/128
[58] Field of Search ................. 360/121, 124, 128–129

[56] References Cited

U.S. PATENT DOCUMENTS

| | | | |
|---|---|---|---|
| 3,192,608 | 7/1965 | Rinia | 360/121 X |
| 3,797,031 | 3/1974 | Hashimoto | 360/124 X |
| 4,072,994 | 2/1978 | Takashima | 360/124 |
| 4,291,352 | 9/1981 | Gooch | 360/124 X |

FOREIGN PATENT DOCUMENTS 58-125215  7/1983  Japan ...................................... 360/124

Primary Examiner—A. J. Heinz
Attorney, Agent, or Firm—Elizabeth E. Strnad; Richard P. Lange

[57] ABSTRACT

A magnetic shield is provided for stray flux reduction from a transducer into a laterally disposed adjacent transducer. The shield substantially covers the transducing winding and extends in close proximity over a rear portion of the magnetic core. The shield does not extend over the transducing gap, to prevent magnetic coupling therewith. In the preferred embodiment a staggered two channel video type transducer has shields on opposite sides thereof in direct contact with the cores. The shields have recesses to accommodate the windings.

15 Claims, 6 Drawing Sheets

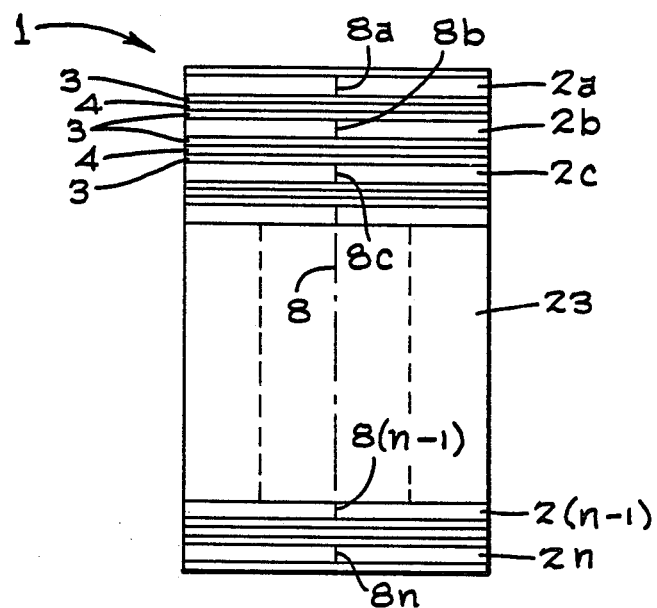
FIG_1A (PRIOR ART)
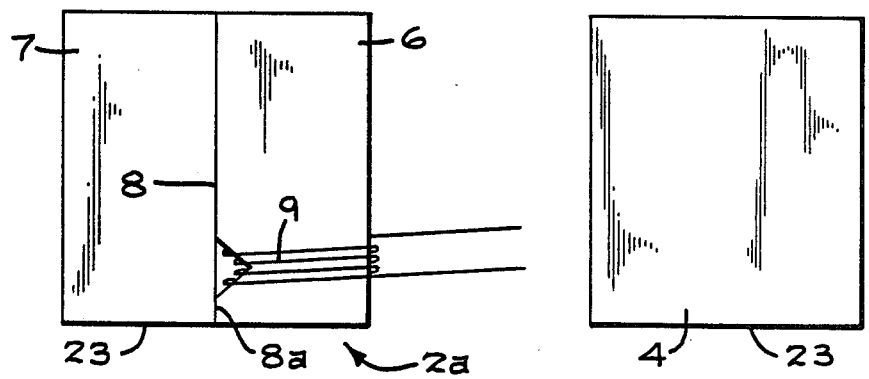
FIG_1B (PRIOR ART)
FIG_1C (PRIOR ART)

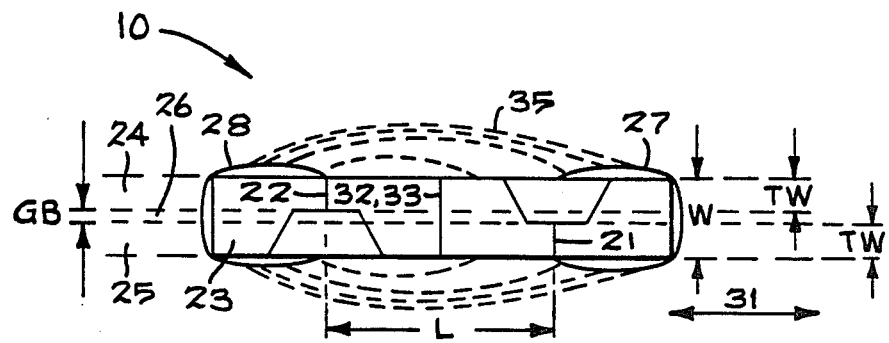
FIG_2A (PRIOR ART)
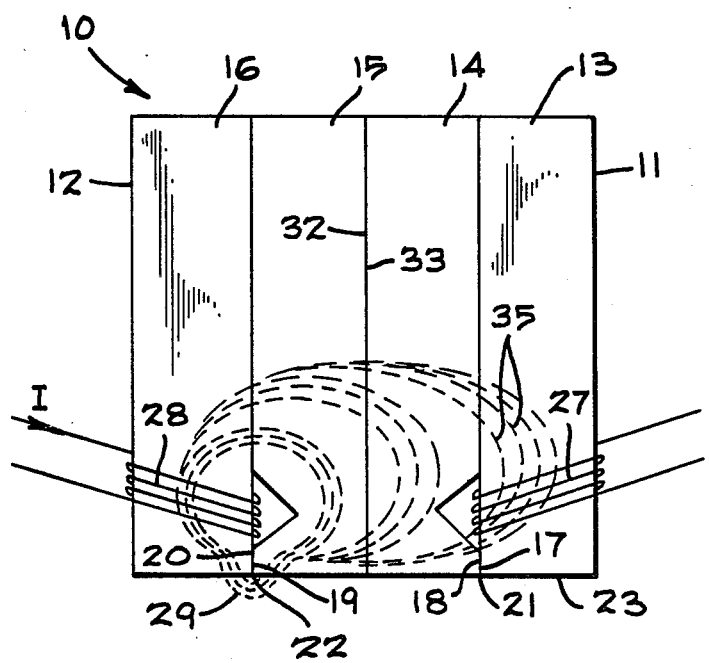
FIG_2B (PRIOR ART)

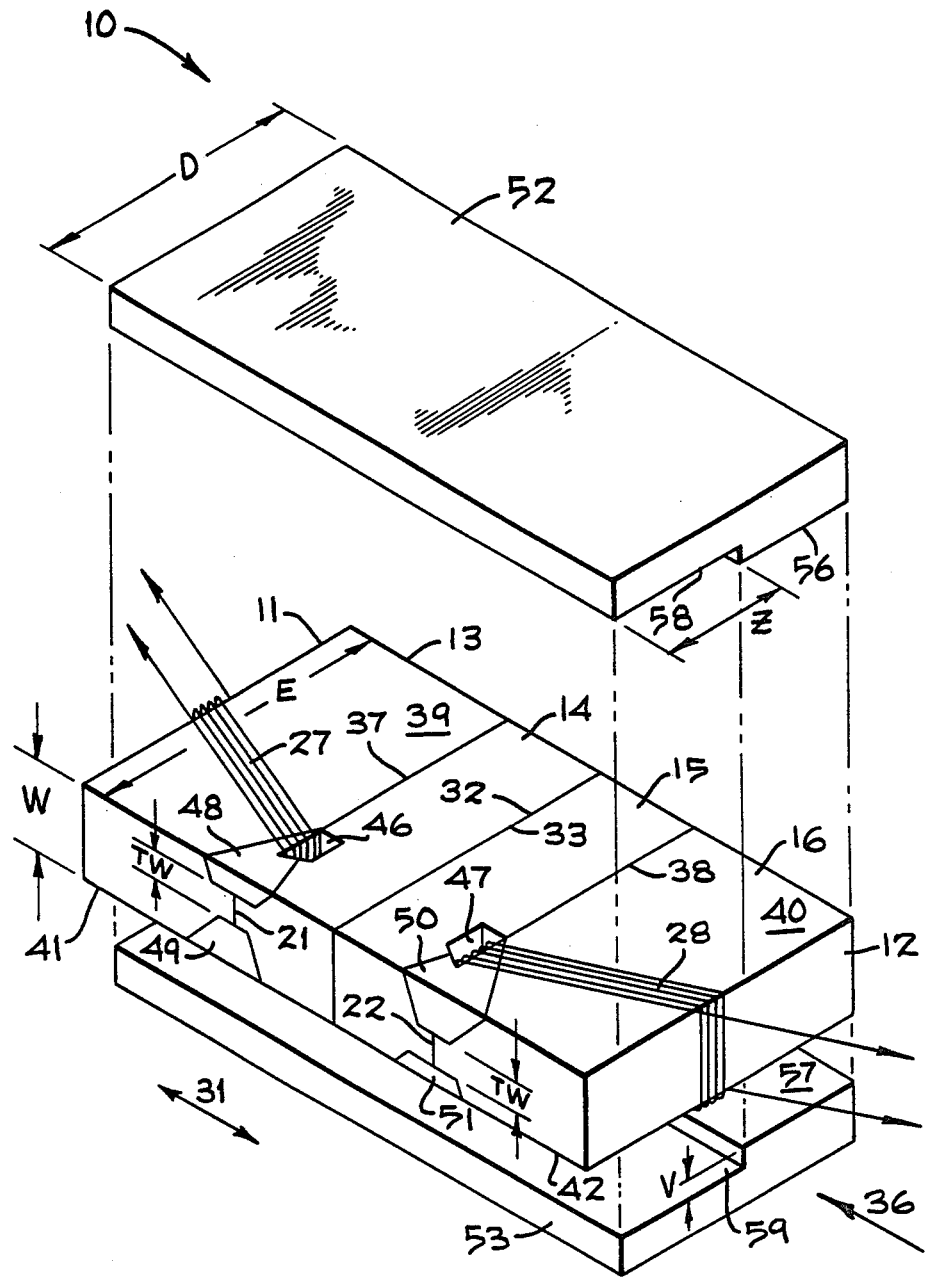
FIG_3

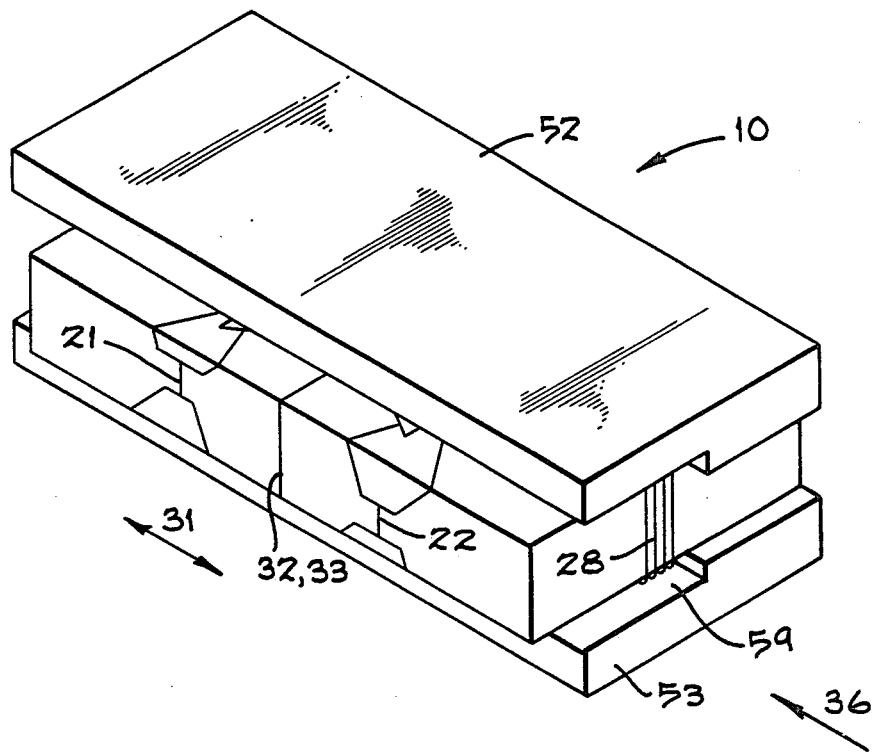
FIG_4
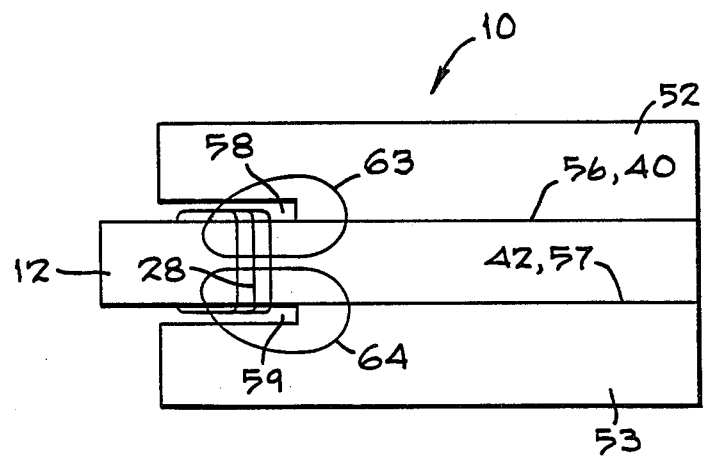
FIG_5

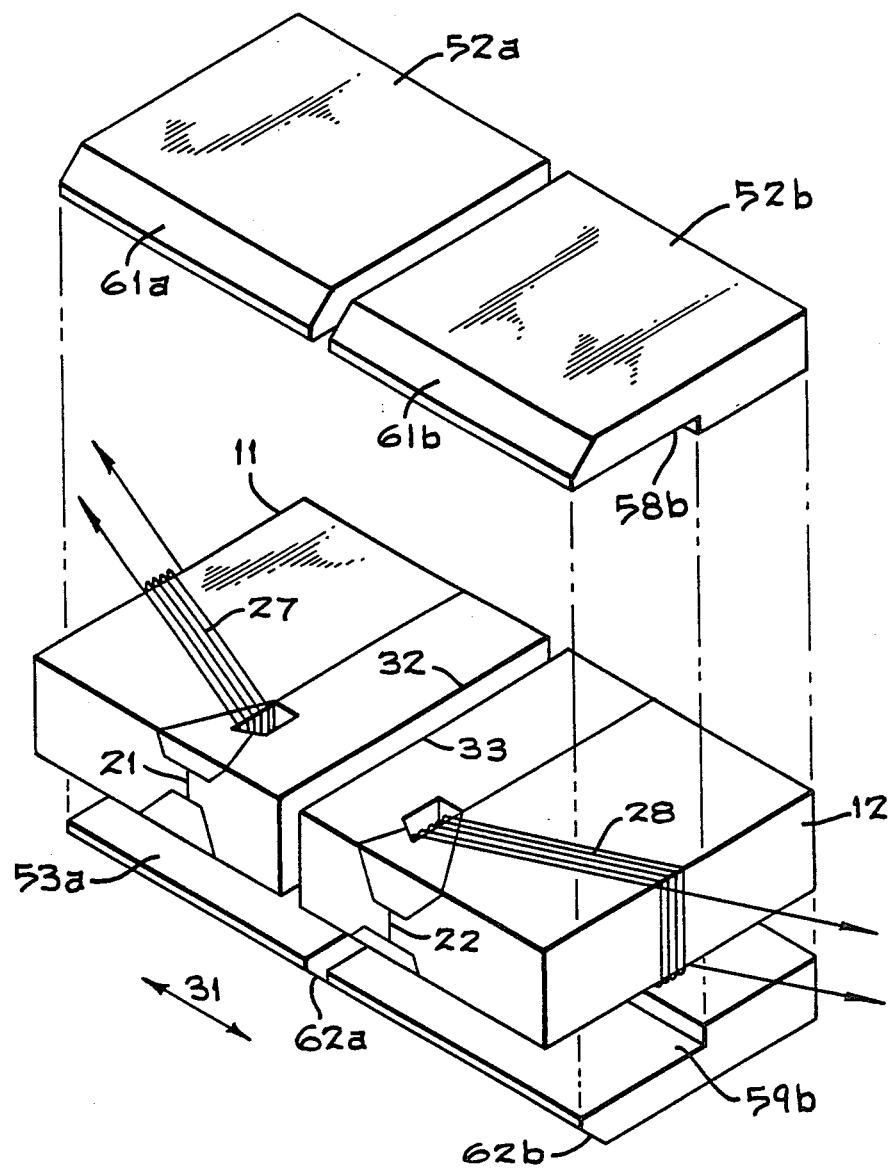
FIG_6

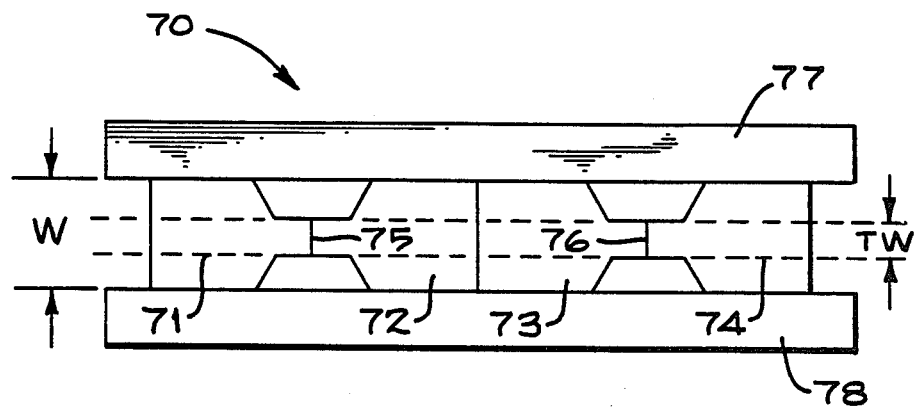
FIG_7

MAGNETIC TRANSDUCER ASSEMBLY WITH IMPROVED CROSSTALK REDUCTION

The invention relates to a magnetic transducer assembly having reduced cross talk between laterally arranged adjacent transducers. More specifically the invention relates to an improved transducer assembly having a magnetic shield for shunting stray flux radiating from the transducing windings in the lateral direction.

During recording or reproduction of information signals on or from a magnetic medium, particularly at high frequencies, a portion of the magnetic flux radiates from the transducing windings into the surrounding area. When magnetic transducers are closely spaced together, the stray flux from one transducer may intercept the magnetic core of an adjacent transducer and cause undesirable cross talk flux therein.

When such transducers are utilized in digital signal recording/reproducing systems, interference caused by cross talk increases the bit error rate, resulting in loss of information. Similarly in recording/reproducing systems utilizing frequency modulation of the information signal, the above-indicated cross talk generally reduces the signal-to-noise ratio, thereby causing undesirable distortion of the information signal.

Multichannel transducers having a plurality of superposed parallel transducing channels are known to utilize interchannel electromagnetic shielding to reduce cross talk between the adjacent superposed channels. The shields extend into the face portion of the transducer to reduce radiation of the flux from the respective gaps into the adjacent gaps superposed therewith. To prevent magnetic shorting of the transducing gap as well as between the adjacent channels, the shields are separated from the magnetic cores by nonmagnetic spacers.

While this known shielding technique provides cross talk protection between the superposed channels, it does not provide sufficient protection for closely spaced transducers whose magnetic cores and transducing gaps are arranged in a lateral direction, that is juxtaposed with respect to each other. Such juxtaposed transducers are for example known from two channel staggered video heads utilized for recording or playback in magnetic television signal recorders. As well known, the transducing cores and gaps of these juxtaposed transducers are laterally offset from each other in the direction of the transducer length. Therefore, any fringing flux radiating from the transducing gap of one transducer will not cause a significant amount of cross talk flux through the magnetic core of an adjacent laterally displaced transducer.

On the other hand these transducers may provide a considerable amount of stray flux emanating from the transducing windings into the surrounding area, particularly at high frequencies. Such stray flux may be air coupled into the laterally spaced core of the adjacent transducer where it causes undesirable cross talk.

The present invention reduces the amount of stray flux radiating from the transducing winding into the surrounding area, particularly in the lateral direction. It prevents thereby a substantial portion of such stray flux generated by the transducing windings from entering into the magnetic core of a laterally arranged adjacent transducer. In accordance with the invention a magnetic shield is provided which extends in close proximity of the magnetic core and substantially covers the transducing windings. The shield does not extend over a portion of the magnetic core which includes the transducing gap to avoid magnetic coupling with the useful flux fringing the transducing gap. The shield, in accordance with the invention, forms a short, low reluctance return path which shunts the stray flux. Because that shunt path is very close to the transducing winding, it effectively prevents radiation of stray flux into the environment thereby preventing it from entering the core of an adjacent laterally spaced transducer.

In one embodiment of the invention the magnetic cores of a two channel video type transducer are integrally joined together side-by-side at their corresponding lateral surfaces. A common magnetic shield extends over the magnetic cores of both transducers with the exception of the area comprising the transducing gaps. The shield has a recess to accommodate the transducing windings and it is in direct contact with the cores of both transducers. The shield thus forms an effective, short, low reluctance return flux paths into each core.

In another embodiment of the invention two separate video type transducers are arranged side-by-side in a closely spaced relationship. A separate magnetic shield extends over the the cores of each transducer, in intimate contact therewith.

The magnetic shields in accordance with the invention may be provided on one side or on both opposite sides of the transducer.

The foregoing and other features and advantages of the invention will be better understood from the following description with reference to the drawings in which various embodiments of the invention are illustrated as examples.

BRIEF DESCRIPTION OF THE DRAWINGS

FIG. 1A is a front schematic view of a prior art multichannel transducer stack.

FIG. 1B is a plan view of one transducing channel utilized in the stack of FIG. 1A.

FIG. 1C is a plan view of a magnetic shield utilized in the stack of FIG. 1A.

FIG. 2A is a front schematic view of a prior art two channel video type transducer having laterally arranged transducing channels.

FIG. 2B is a plan view of the magnetic transducer of FIG. 2A showing cross talk flux paths.

FIG. 3 is an exploded view of a two channel transducer assembly with improved cross talk reduction in accordance with one embodiment of the invention.

FIG. 4 is a perspective view of the two channel transducer assembly of FIG. 3.

FIG. 5 is an end view of the two channel transducer assembly of FIG. 4 taken in the direction of arrow 36, showing a low reluctance stray flux path in accordance with the invention.

FIG. 6 is an exploded view of a two channel transducer assembly with improved cross talk reduction in accordance with another embodiment of the invention.

FIG. 7 is a front schematic view of a single channel, dual gap transducer assembly of an alternative embodiment of the invention.

DETAILED DESCRIPTION

To facilitate comparison between the various drawing figures similar elements will be designated by like reference numerals throughout the drawings.

For better understanding of the advantages of the present invention, first examples of prior art transducers will be described with reference to FIGS. 1A to 2B.

A front schematic view of a known multichannel transducer structure 1 is shown in FIG. 1A. The multichannel transducer 1 has a plurality of superposed transducing channels 2a to 2n. Adjacent channels are separated by magnetic shields 4 sandwiched between nonmagnetic spacers 3. One transducing channel, for example 2a, is shown in the plan view of FIG. 1B. It has two confronting magnetic cores 6, 7 abutting at a transducing gap plane 8. The cores define magnetic poles with a transducing gap 8a therebetween. A transducing winding 9 is wound around core 6. A plan view of a magnetic shield 4 is shown in FIG. 1C.

As it is seen from FIGS. 1A to 1C, the gaps 8a to 8n are aligned along a common transducing gap plane 8. The interchannel shields 4 extend over the entire surface of the cores 6, 7, including the transducing gaps 8a to 8n and are flush with the front surface 23 of the transducer facing a recording medium.

While these interchannel shields between the superposed channels effectively reduce cross talk radiating in the direction of the superposed channels, including cross talk originating from the adjacent transducing gaps, these known shields do not provide adequate cross talk protection in the lateral direction.

An example of a known two channel staggered transducer assembly 10 is illustrated in FIGS. 2A and 2B. Such transducer is known to be utilized for example for recording or playback along parallel tracks of a magnetic medium in helical scan video recorders. The assembly 10 has two transducers 11, 12 arranged in lateral relationship with each other. It will be also referred to this lateral arrangement of transducers as being side-by-side or in juxtaposition. Each transducer 11, 12 has a pair of confronting magnetic cores 13, 14 and 15, 16. Each pair defines confronting magnetic poles 17, 18 and 19, 20, which in turn define a transducing gap 21, 22 therebetween, respectively. The transducers 11, 12 are joined side-by-side at their corresponding lateral surfaces 32, 33. Consequently the transducing gaps 21, 22 are offset by a distance L in the lateral direction indicated by arrow 31, that is, in the direction of the length of the transducer assembly 10. In addition, the transducing gaps 21, 22 are offset and separated from each other by a distance GB in a direction perpendicular to direction 31, that is in the direction of the width W of the transducer assembly 10. As it is shown by interrupted lines, each transducing gap 21, 22 forms a separate transducing channel 24, 25 for recording on or playing back signals from adjacent parallel recording tracks of a medium (now shown). Each channel has a width TW and is separated from adjacent channels by the distance GB. The distance GB determines the guard band between the adjacent parallel tracks.

When for example a recording current I is applied to the transducing winding 28 from a recording circuit (not shown) in a known manner, that recording current I induces a magnetic flux flow in the cores 15, 16, as it is shown by interrupted flux lines in FIGS. 2A and 2B. A portion of that flux shown at 29 which fringes from the transducing gap 22 corresponds to a useful recording flux intercepting a recording medium (not shown). Another portion of the flux induced by winding 28 which does not fringe from gap 22 into the medium is referred to as stray flux and is shown at 35. The stray flux 35 includes laterally extending flux lines which intercept the cores 13, 14 and thus winding 27 of the laterally spaced adjacent transducer 11. By intercepting the magnetic circuit of the adjacent transducer 11, the stray flux 35 causes undesirable cross talk therein.

With reference to the foregoing description it will be understood that a cross-talk flux such as above described as being caused by a recording current induced from one transducer into an adjacent laterally arranged transducer, may also be caused by a fringing playback flux.

Now a preferred embodiment of the invention will be described with reference to FIG. 3. FIG. 3 shows a two channel transducer assembly 10, including transducers 11, 12 joined side-by-side at corresponding lateral surfaces 32, 33. Two pairs of transducer cores 13, 14; 15, 16 are made of a magnetic material, for example ferrite. These pairs of cores are lapped and polished at confronting lateral surfaces 37, 38 to obtain confronting magnetic poles. A nonmagnetic transducing gap forming material, for example glass is provided on the confronting magnetic poles to obtain transducing gaps 21, 22 respectively, in a well known manner.

A transducing winding window 46, 47 is cut in at least one core of each transducer 11, 12 to accommodate a transducing winding 27, 28, respectively.

In order to reduce the track width from a width W of the transducers 11, 12 to a desired track width TW, the transducer cores are preferably notched as shown at 48 to 51, utilizing well known notching techniques. The notches are thereafter preferably filled with a nonmagnetic material, for example glass, in a well known manner. The thusly obtained transducers 11, 12 are joined at corresponding lateral surfaces 32, 33 for example by epoxy or glass bonding in a well known manner to obtain integrally joined contiguous cores. The upper surfaces 39, 40 and the lower surfaces 41, 42 of the joined transducer cores are lapped and polished to obtain a smooth surface finish. Thereafter the windings 27, 28 are wound around the cores through the respective winding windows 46, 47. In this embodiment, the relative azimuths of the transducing gaps 21, 22 and the distance GB between these laterally arranged transducing gaps are permanently adjusted during manufacturing of the transducer assembly 10. Consequently, no such adjustments are later necessary and therefore the mount for holding and mounting the transducer assembly to the recording/reproducing device does not need to be made adjustable.

One or two shields of a magnetic material, for example ferrite may be provided. In the herein described embodiment of FIG. 3 two corresponding shields 52, 53 are made, further referred to as upper shield 52 and lower shield 53. The shields 52, 53 are preferably cut from a block of a hot pressed ferrite material by the well known saw cutting technique. The material of the shields is selected to have a high permeability at the operating frequencies of the transducer. Each shield has an inner surface 56, 57 thereafter referred to as a lower surface 56 of shield 52 and an upper surface 57 of shield 53. Recesses 58, 59 are cut inwardly of the surfaces 56, 57 preferably by saw cutting. The recesses 56, 57 have a width V and a depth Z which are selected sufficient to accommodate the transducing windings 27, 28. The depth D of the shields 52, 53 is made smaller than the depth E of the transducer cores to assure that when the shields and cores are assembled, the shields will not extend over the front portion of the cores which include the transducing gaps to avoid magnetic coupling with the useful flux which fringes the transducing gap during recording or playback.

Thereafter the lower surface 56 and upper surface 57 of the shields 52, 53 are lapped and polished to obtain good mechanical contact with the surfaces 39 to 42 of the magnetic cores when the transducers and shields are assembled.

Preferably the length of each shield 52, 53 extends beyond that of the magnetic cores on both sides, in the direction of arrow 31, as best shown in FIG. 4, to obtain better shielding of stray flux from the windings in the lateral direction.

The shields 52, 53 extend over the transducer cores such that the lower surface 56 of shield 52 preferably abuts a portion of the upper surfaces 39, 40, of the core extending below the transducing gap. Similarly, the upper surface 57 of shield 53 preferably abuts the rear portion of lower surfaces 41, 42 of the transducer cores. While a limited cross talk reduction in the lateral direction may be obtained when the shields are in close proximity of the cores, a direct contact between the shields and cores is preferred. The better is the mechanical contact between these abutting surfaces the more effective will be the magnetic coupling of the stray flux provided by these shields 52, 53.

It will be understood from the foregoing description that it is preferable to completely cover the transducing winding with the shield or shields to obtain maximum crosstalk reduction. However, when all of the winding cannot be covered, for example for construction reasons, crosstalk reduction will still be obtained when a substantial portion of the windings is covered.

FIG. 4 shows the two channel transducer assembly 10 of FIG. 3 as being assembled with the magnetic shields 52, 53 in accordance with the he foregoing description. The shields are held in place preferably by applying epoxy adhesive both to the shields and transducer cores around the periphery of the abutting surfaces.

FIG. 5 shows an end view of the assembly 10 of FIG. 4, taken in the direction of arrow 36. It is seen from FIGS. 3 to 5 that the shields 52, 53 snuggly cover the windings 27, 28 and at the same time they are in direct intimate contact with the transducer cores. As it is shown in FIG. 5 at 63 and 64, the shields provide a low reluctance return path of the stray flux extending from each transducing winding, which stray flux may be otherwise induced in the laterally displaced adjacent transducer core and intercept the therewith associated winding. Because of its closeness to the windings and the intimate contact with the rear portion of the core, the return flux path provided by the shield is very effective, resulting in considerable reduction of cross talk.

As an example, a 10 to 25 dB reduction in cross talk has been obtained for a 15 MHz signal by the transducer of the invention. In this particular example, a cross talk of 30 db has been measured, when no shields were utilized; 40 to 45 db when a shield on one side of the transducer was used; and 50 to 55 db when shields on both sides of the transducer were used.

Another embodiment of the transducer in accordance with the invention is shown in FIG. 6. In this embodiment the transducers 11, 12 are made as previously described but they are not joined together at the lateral surfaces 32, 33. Instead, there is an air space between these surfaces. Instead of the contiguous upper shield 52 of FIGS. 3 and 4 two separate upper shields 52a and 52b are made. Similarly, instead of the contiguous lower shield 53 of the previously described embodiment two separate lower shields 53a, 53b are made. These shields are preferably made in a similar way and of a similar material as it has been described with reference to the embodiment of FIGS. 3 and 4. In the embodiment of FIG. 6 the shields 52a to 53b are shown as having bevelled front surfaces 61a to 62b, for example obtained by saw cutting or lapping.

As it has been previously indicated, it is possible to utilize shields only on one side of the transducer, that is only upper shields or, alternatively only lower shields. However, when both upper and lower shields are utilized, better rejection of cross talk between the laterally arranged transducers is obtained, as it has been illustrated by the foregoing example.

With respect to the separate core and shield structures of the transducers 11 and 12 for each channel, in the embodiment of FIG. 6 the respective azimuths of the transducing gaps 21, 22 as well as the guard band determining width GB between the gaps can be adjusted after the transducers are inserted in their respective holders, for example mounted on a rotating scanner drum and can be re-adjusted any time thereafter.

While the above-described two channel transducers have their respective transducing gaps shown as extending in perpendicular planes to the upper and lower surfaces 39 to 42 of the transducer cores the present invention may be utilized with other types of transducers, for example which have their transducing gap planes extending at an azimuth angle to these surfaces.

The above-described embodiments of the invention are related to two channel video type transducers. It follows from the foregoing disclosure that other types of transducer assemblies which have laterally displaced transducing cores and gaps will have a reduced channel-to-channel cross talk when provided in accordance with the invention. For example, a single channel read-after-write transducer when provided in accordance with the invention will have a significantly reduced cross talk, particularly from the write into the read portion thereof.

In FIG. 7 an example of such a dual gap single channel transducer assembly 70 in accordance with the present invention is shown. Two pairs of magnetic cores 71, 72; 73, 74 are arranged side-by-side in a similar manner as previously described with reference to FIGS. 3 to 6.

The embodiment of FIG. 7 is different from the previously described embodiments in that the respective pairs of cores and transducing gaps 75, 76 are in a non-staggered arrangement. That is, there is no relative offset between the gaps 75, 76 in the direction of the width W of the transducer which would provide two parallel recording or playback channels, as it has been shown in FIG. 2A at 24 and 25.

In the presently described embodiment one of the transducing gaps 75, 76 may be utilized for recording and the other one of the gaps for playback of the signal recorded on a particular track of the medium (not shown) by the first gap. Thus the transducer assembly 70 is preferably utilized as a single channel, dual gap, read-after-write transducer.

Two magnetic shields 77, 78 are provided preferably in the same manner as above-described with reference to the embodiments of FIGS. 3 to 6. Consequently, each shield 77, 78 preferably has a recess such as shown at 58, 59 in FIG. 3 to cover the recording and playback windings (not shown in FIG. 7), which are provided in a similar manner as windings 27, 28 shown in FIG. 3.

Similarly as in the previously described embodiments of the invention, the shields 77, 78 are preferably in direct contact with the transducer cores, except in an area comprising the transducing gaps 75, 76 to avoid magnetic coupling with the useful flux fringing these gaps.

Because of the similarities related to all other aspects of the invention, between the previously described embodiments of FIGS. 3 to 6 and FIG. 7, further description of the transducer assembly of FIG. 7 will not be provided to avoid repetition.

What is claimed:

1. A magnetic transducer assembly, comprising:
   a magnetic core having at least two pairs of confronting magnetic poles, each pair defining a transducing gap therebetween, said magnetic core having a depth extending in a direction substantially perpendicular to a transducer-to-medium interface, and said pairs of poles being displaced from each other in the direction substantially perpendicular to a track width;
   a separate transducing winding associated with each said pair of poles and arranged on said core; and
   a shield of a magnetically permeable material substantially covering each said transducing winding and extending over said magnetic core in close proximity thereof, said shield having a depth smaller than said depth of said magnetic core, and being arranged outside an area comprising said transducing gaps to prevent magnetic coupling therewith.

2. The transducer of claim 1 wherein two separate magnetic shields are provided, each shield extending over one said pair of confronting magnetic cores and substantial covering said transducing winding associated with said pair of poles.

3. The transducer assembly of claim 1 wherein said shield is in direct contact with said magnetic core.

4. The transducer assembly of claim 1 wherein said magnetic shield has a recessed portion substantially covering said transducing winding.

5. The transducer assembly of claim 1 wherein two magnetic shields are provided, each shield extending over one opposite surface of said magnetic core.

6. The transducer assembly of claim 1 wherein said shield has a bevelled surface extending at an acute angle converging toward said transducing gaps.

7. The transducer of claim 1 wherein a length of said shield exceeds a length of said magnetic core in the direction substantially perpendicular to said track width.

8. The transducer of claim 1 wherein said shield is provided as a contiguous piece of said magnetically permeable material.

9. A magnetic transducer for use in a two channel magnetic transducer assembly having magnetic cores pertaining to each channel displaced from each other in the direction substantially perpendicular to a track width, comprising:
   a magnetic core having a pair of confronting magnetic poles defining a transducing gap therebetween, said magnetic core having a depth extending in a direction substantially perpendicular to a transducer-to-medium interface;
   a transducing winding arranged on said core; and
   a shield of magnetically permeable material substantially covering said transducing winding and extending over said magnetic core in direct contact therewith, said shield having a depth smaller than said depth of said magnetic core, and being arranged outside an area comprising said transducing gap to prevent magnetic coupling therewith.

10. A magnetic transducer for use in a two channel magnetic transducer assembly having magnetic cores pertaining to each channel displaced from each other in the direction substantially perpendicular to a track width, comprising:
    a magnetic core having a pair of confronting magnetic poles defining a transducing gap therebetween, said magnetic core having a depth extending in a direction substantially perpendicular to a transducer-to-medium interface;
    a transducing winding arranged on said core; and
    a shield of magnetically permeable material having a recessed portion substantially covering said transducing winding, said shield extending over said magnetic core in close proximity thereof, having a depth smaller than said depth of said magnetic core and being arranged at a distance from said transducing gap to prevent magnetic coupling therewith.

11. A magnetic transducer for use in a two channel magnetic transducer assembly having magnetic cores pertaining to each channel spaced from each other in the direction substantially perpendicular to a track width, comprising:
    a magnetic core having a pair of confronting magnetic poles defining a transducing gap therebetween, said magnetic core having a depth extending in a direction substantially perpendicular to a transducer-to-medium interface;
    a transducing winding arranged to said core; and
    a shield of magnetically permeable material having a recessed portion substantially covering said transducing winding, said shield extending over said magnetic core in direct contact therewith, and having a depth smaller than said depth of said magnetic core, said shield being arranged outside an area comprising said transducing gap to prevent magnetic coupling therewith.

12. A magnetic transducer assembly having two transducing channels, comprising:
    a magnetic core having two pairs of confronting magnetic poles, each pair of poles defining a transducing gap therebetween, pertaining to one of said channels, said magnetic core having a depth extending in a direction substantially perpendicular to a transducer-to-medium interface, said core comprising at least one magnetic core portion which is common to both transducing channels, said pairs of poles being spaced from each other in the direction substantially perpendicular to a track width;
    a separate transducing winding associated with each said transducing channel, respectively; and
    a shield made of a magnetically permeable material substantially covering each said transducing winding and extending over said magnetic core in direct contact therewith, and having a depth smaller than said depth of said magnetic core, said shield being arranged outside an area comprising said transducing gap to prevent magnetic coupling with said gap, and wherein said shield has at least one recess to accommodate said transducing windings.

13. A magnetic transducer assembly having two transducing channels, comprising:
    two pairs of magnetic cores, each pair having two confronting magnetic poles, defining a transducing gap therebetween, pertaining to one of said channels, said pairs of cores having a depth extending in a direction substantially perpendicular to a transducer-to-medium interface, said pairs of cores being in closely spaced relationship, displaced from each other in the direction substantially perpendicular to a track width, each pair of cores having opposite parallel surfaces;

a separate transducing winding associated with each said pair of cores, respectively; and a separate shield of a magnetically permeable material substantially covering each said transducing winding and extending over at least one of said parallel surfaces of each said pair of cores in direct contact therewith, said shield having a depth smaller than said depth of said magnetic core and being arranged outside an area comprising said transducing gap to prevent magnetic coupling with said gap, and wherein each said shield has a recess to accommodate said transducing windings.

14. A magnetic transducer assembly having at least two transducing channels, offset with respect to each other in the direction of a transducer width, comprising:

a magnetic core having at least two pairs of confronting magnetic poles, each pair of poles defining a transducing gap therebetween, pertaining to one said transducing channel, said magnetic core having a depth extending in a direction substantially perpendicular to a transducer-to-medium interface, said pairs of poles being displaced from each other in the direction substantially perpendicular to a track width;

a separate transducing winding associated with each transducing channel, and arranged on said core; and a shield of a magnetically permeable material substantially covering each said transducing winding and extending over said magnetic core in close proximity thereof, said shield having a depth smaller than said depth of said magnetic core, and being arranged outside an area comprising said transducing gaps to prevent magnetic coupling therewith.

15. A dual gap, single channel magnetic transducer assembly, comprising:

a magnetic core having two pairs of confronting magnetic poles, each pair defining a transducing gap therebetween, said respective gaps pertaining to the same channel within said transducer assembly, said magnetic core having a depth extending in a direction substantially perpendicular to a transducer-to-medium interface, and said pairs of poles being spaced from each other in the direction substantially perpendicular to a track width;

a separate transducing winding associated with each said pair of poles; and a shield of a magnetically permeable material substantially covering each said winding and extending over said magnetic core in direct contact therewith, said shield having a depth smaller than said depth of said magnetic core and being arranged outside an area comprising said transducing gaps to prevent magnetic coupling therewith.

* * * * *